(12) United States Patent
Kogure

(10) Patent No.: US 10,012,825 B2
(45) Date of Patent: Jul. 3, 2018

(54) LIGHT IRRADIATING DEVICE

(71) Applicant: HOYA CANDEO OPTRONICS CORPORATION, Toda-shi, Saitama (JP)

(72) Inventor: Yasuo Kogure, Toda (JP)

(73) Assignee: HOYA CANDEO OPTRONICS CORPORATION, Toda-Shi, Saitama (JP)

( * ) Notice: Subject to any disclaimer, the term of this patent is extended or adjusted under 35 U.S.C. 154(b) by 0 days.

(21) Appl. No.: 15/458,862

(22) Filed: Mar. 14, 2017

(65) Prior Publication Data

US 2017/0269343 A1    Sep. 21, 2017

(30) Foreign Application Priority Data

Mar. 18, 2016 (JP) ................. 2016-055506

(51) Int. Cl.
| | |
|---|---|
| *G02B 19/00* | (2006.01) |
| *B41M 7/00* | (2006.01) |
| *B41F 23/04* | (2006.01) |
| *B41J 11/00* | (2006.01) |
| *F26B 3/28* | (2006.01) |
| *H05B 33/02* | (2006.01) |
| *B41J 3/407* | (2006.01) |

(52) U.S. Cl.
CPC ........ *G02B 19/009* (2013.01); *B41F 23/0409* (2013.01); *B41J 3/4073* (2013.01); *B41J 11/002* (2013.01); *B41M 7/0081* (2013.01); *F26B 3/28* (2013.01); *G02B 19/0066* (2013.01); *H05B 33/02* (2013.01)

(58) Field of Classification Search
CPC . G02B 19/009; G02B 19/0066; B41M 7/0081
USPC ...... 250/492.1, 493.1, 504 R, 453.11–455.11
See application file for complete search history.

(56) References Cited

U.S. PATENT DOCUMENTS

| | | |
|---|---|---|
| 2004/0166249 A1 | 8/2004 | Siegel |
| 2005/0104946 A1 | 5/2005 | Siegel |
| 2006/0204670 A1 | 9/2006 | Siegel |
| 2015/0158312 A1* | 6/2015 | Childers ............... B41J 11/002 347/102 |

(Continued)

FOREIGN PATENT DOCUMENTS

| | | |
|---|---|---|
| EP | 0493691 A1 | 7/1992 |
| EP | 0709620 A1 | 5/1996 |

(Continued)

*Primary Examiner* — Michael Maskell
(74) *Attorney, Agent, or Firm* — Rabin & Berdo, P.C.

(57) ABSTRACT

A light irradiating device includes a plurality of LED elements which is disposed on a substrate along a first direction and irradiatesan ultraviolet ray on an irradiating object; and a plurality of light collecting units which is disposed in an optical path of each LED element and forms the ultraviolet ray emitted from each LED element to have a narrow spread angle, in which the ultraviolet ray which passes through the light collecting unit to be directed to the irradiating object has a first light distribution peak which is inclined to an upstream side of the first direction at a first angle and a second light distribution peak which is inclined to a downstream side of the first direction at a second angle, with respect to a second direction which is perpendicular to the first direction.

12 Claims, 12 Drawing Sheets

(56) References Cited

U.S. PATENT DOCUMENTS

2015/0314614 A1* 11/2015 Taguchi ............ G02B 19/0066
  347/102
2016/0288532 A1* 10/2016 Kobayashi ............ B41J 11/002

FOREIGN PATENT DOCUMENTS

| JP | H08-174567 A | 7/1996 |
| JP | 2010-015898 A | 1/2010 |
| JP | 2011-060798 A | 3/2011 |
| JP | 2012-232415 A | 11/2012 |
| JP | 2015-153771 A | 8/2015 |
| WO | WO 2005-068205 A1 | 7/2005 |
| WO | WO 2005-068511 A1 | 7/2005 |
| WO | WO 2013-099941 A1 | 7/2013 |

* cited by examiner

LIGHT IRRADIATING DEVICE

CROSS-REFERENCE TO RELATED APPLICATIONS

This application claims priority to and the benefit of Japanese Patent Application No. 2016-055506 filed in the Japan Intellectual Property Office on Mar. 18, 2016, the entire contents of which are incorporated herein by reference.

TECHNICAL FIELD

The present invention relates to a light irradiating device which irradiates an ultraviolet ray onto a stereoscopic irradiating object which relatively moves in one direction, and more particularly, to a light irradiating device which hardens an ultraviolet curable resin applied on a surface of an irradiating object using a light emitting diode (LED) as a light source.

BACKGROUND ART

In the related art, as an offset sheet-fed printing ink, an ultraviolet curable ink which is hardened by irradiating an ultraviolet ray is used. Further, recently, when printing is performed on a material which is hardly dried such as metal or plastic, other than paper, an ultraviolet curable ink is used to quickly dry the ink and increase productivity per hour. In order to harden the ultraviolet curable ink, generally, an ultraviolet ray irradiating device which irradiates an ultraviolet ray is used.

As the ultraviolet ray irradiating device, a lamp type irradiating device using a high pressure mercury lamp or a mercury xenon lamp as a light source has been known in the related art. For example, in Patent Document 1, a configuration in which light is irradiated on a workpiece conveyed by a conveyer belt by a lamp type irradiating device to harden the ultraviolet curable ink on a surface of the workpiece is disclosed.

Recently, due to demands for reducing power consumption, increasing a life span, and compacting a device size, an ultraviolet ray irradiating device which uses an LED as a light source, instead of a discharge lamp of the related art, has been developed. The ultraviolet ray irradiating device using the LED as a light source, for example, is disclosed in Patent Document 2 and a plurality of substrates on which a plurality of light emitting diodes (LEDs) is mounted is arranged to have a straight line shape to obtain a linear ultraviolet ray.

RELATED ART DOCUMENT

Patent Document (Patent Document 1) Japanese Patent Application Laid-Open No. 1996-174567
(Patent Document 2) Japanese Patent Application Laid-Open No. 2015-153771

SUMMARY OF THE INVENTION

According to a configuration disclosed in Patent Document 1, when the ultraviolet curable ink is applied only on a top surface of the workpiece, the ultraviolet irradiating device is disposed to be opposite to the top surface of the workpiece and an ultraviolet ray is irradiated from one direction to harden the ultraviolet curable ink. However, in the case of a workpiece (an irradiating object) having a three-dimensional shape such as a beer or juice can, a PET bottle, or a shampoo or cosmetic bottle, it is necessary that an ultraviolet ray is irradiated from a plurality of directions (for example, a front side, a rear side, a right side, and a left side of a conveying direction) according to a shape of a surface on which the ultraviolet curable ink is applied or the ultraviolet ray is irradiated while rotating the workpiece.

As a configuration which irradiates an ultraviolet ray on a workpiece from a plurality of directions, a configuration in which a plurality of ultraviolet irradiating devices is disposed to enclose the workpiece may be considered. However, according to this configuration, when the ultraviolet irradiating device is disposed at the front side and the rear side of the conveying direction of the workpiece, the workpiece cannot be conveyed. Accordingly, in order to irradiate an ultraviolet ray on the front side and the rear side of the conveying direction of the workpiece, the ultraviolet ray is irradiated while stopping the workpiece in a space enclosed by a plurality of ultraviolet irradiating devices. However, when the workpiece stops, the production efficiency may be deteriorated.

In the case of a configuration which irradiates the ultraviolet ray while rotating the workpiece, a device which rotates the workpiece while supporting the workpiece is necessary, so that the entire device becomes complex and a size of the device is also increased.

The present invention has been made in an effort to provide a light irradiating device which irradiates an ultraviolet ray on a three-dimensional irradiating object which moves in one direction, not only from a side of a conveying direction, but also from the front side and the rear side.

An exemplary embodiment of the present invention provides a light irradiating device which irradiates an ultraviolet ray on a three-dimensional irradiating object which relatively moves along a first direction to harden an ultraviolet curable resin applied on a surface of the irradiating object. The light irradiating device includes a plurality of LED elements which is disposed on a substrate along the first direction and irradiates the ultraviolet ray on the irradiating object; and a plurality of light collecting units which is disposed in an optical path of each LED element and forms the ultraviolet ray emitted from each LED element to have a narrow spread angle, and the ultraviolet ray which passes through the light collecting unit to be directed to the irradiating object has a first light distribution peak which is inclined to an upstream side of the first direction at a first angle and a second light distribution peak which is inclined to a downstream side of the first direction at a second angle, with respect to a second direction which is perpendicular to the first direction.

According to this configuration, the ultraviolet ray which is irradiated onto the irradiating object has a first light distribution peak and a second light distribution peak inclined with respect to the second direction so that the ultraviolet ray may be irradiated onto the irradiating object not only from a side of a conveying direction, but also from a front side and a rear side.

The plurality of LED elements and the plurality of light collecting units may have a common optical axis which is parallel to the second direction, and light irradiating device may further include a light distribution control unit which includes a first incident surface inclined toward the upstream side of the first direction with respect to the optical axis and a second incident surface inclined toward the downstream side of the first direction and emits the ultraviolet ray emitted from the plurality of light collecting units by being refracted at the first angle and the second angle. Further, in this case, the first incident surface and the second incident surface may be alternately formed along the first direction. Further, in this case, the plurality of LED elements may be disposed with a predetermined interval along the first direction and the first incident surface and the second incident surface may be alternately formed with the predetermined interval so as to correspond to each LED element.

The plurality of LED elements may be disposed with a predetermined interval along the first direction and the first incident surface and the second incident surface may be formed with an interval which is smaller than the predetermined interval.

The plurality of LED elements may be disposed with a predetermined interval along the first direction and the first incident surface and the second incident surface may be formed with an interval which is larger than the predetermined interval.

The light distribution control unit may be a prism.

Each of the LED elements and each of the light collecting units may configure an LED module and the LED modules may be configured by a first LED module having an optical axis inclined at the first angle with respect to the second direction and a second LED module having an optical axis inclined at the second angle with respect to the second direction.

Each of the LED elements and each of the light collecting units may have a common optical axis and an attached surface of the first LED module and the second LED module may be inclined with respect to the second direction.

Each of the LED elements and each of the light collecting units may have different optical axes and an attached surface of the first LED module and the second LED module may be a plane perpendicular to the second direction.

The light collecting unit may be configured to divide the ultraviolet ray emitted from each of the LED elements into light at the first angle and light at the second angle.

The light collecting unit may be a light collecting lens or a light collecting mirror.

As described above, according to the present invention, it is possible to implement a light irradiating device which irradiates an ultraviolet ray on a three-dimensional irradiating object which moves in one direction, not only from a side of a conveying direction, but also from the front side and the rear side.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
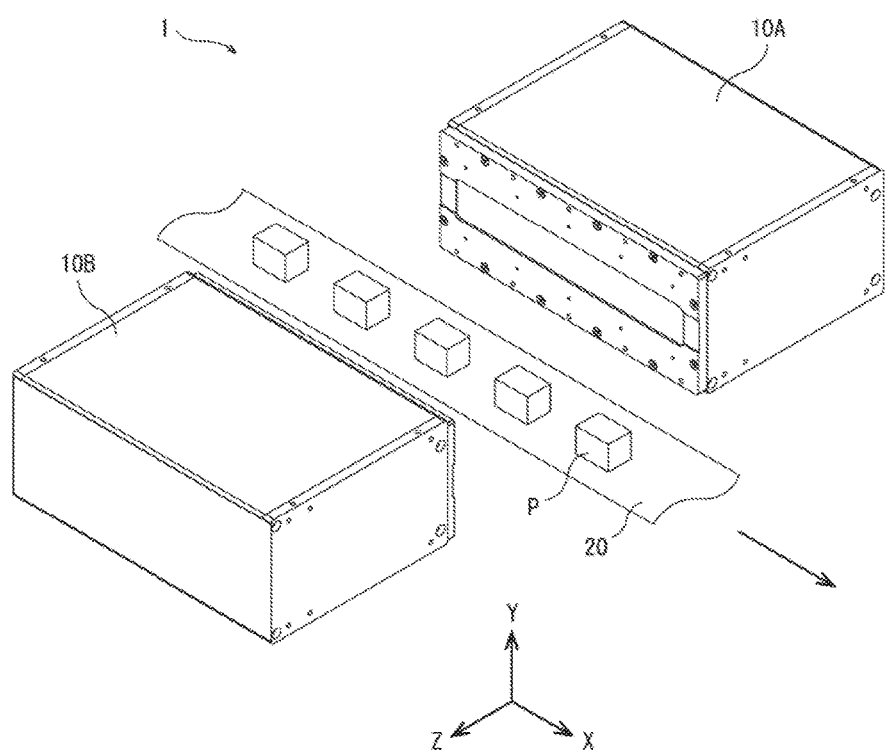
FIG. 1 is a perspective view illustrating a configuration of a light irradiating system which uses a light irradiating device according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the drawings. Further, in the drawings, like elements are denoted by like reference numerals, and description thereof will not be repeated.

(First Exemplary Embodiment)

FIG. 1 is a perspective view illustrating a configuration of a light irradiating system 1 which uses light irradiating devices 10A and 10B according to a first exemplary embodiment of the present invention. As illustrated in FIG. 1, the light irradiating system 1 is a system which hardens an ultraviolet curable resin applied on a surface of an irradiating object P and is configured by a conveyer belt 20 on which the irradiating object P is loaded to be moved in a predetermined direction (a direction indicated by an arrow of FIG. 1) and a pair of light irradiating devices 10A and 10B which are disposed to be opposite to each other with the conveyer belt 20 therebetween and irradiate a linear ultraviolet ray on the irradiating object P from two directions. Even though one pair of light irradiating devices 10A and 10B of the exemplary embodiment is disposed in different positions and directions, but the devices have the same configuration. Therefore, hereinafter, the light irradiating device 10A will be representatively described. Further, hereinafter, in this specification, a direction where a length (that is, a line length) of the linear ultraviolet ray emitted from the light irradiating device 10A is long is defined as an X-axis direction, a direction (that is, a vertical direction of FIG. 1) where the length is short is defined as a Y-axis direction and a direction perpendicular to the X-axis and the Y-axis is defined as a Z-axis direction. Further, as illustrated in FIG. 1, in this exemplary embodiment, for the convenience of description, it is described that the irradiating object P is a rectangular parallelepiped whose front surface faces the conveying direction (the X-axis direction).

Figure 2:
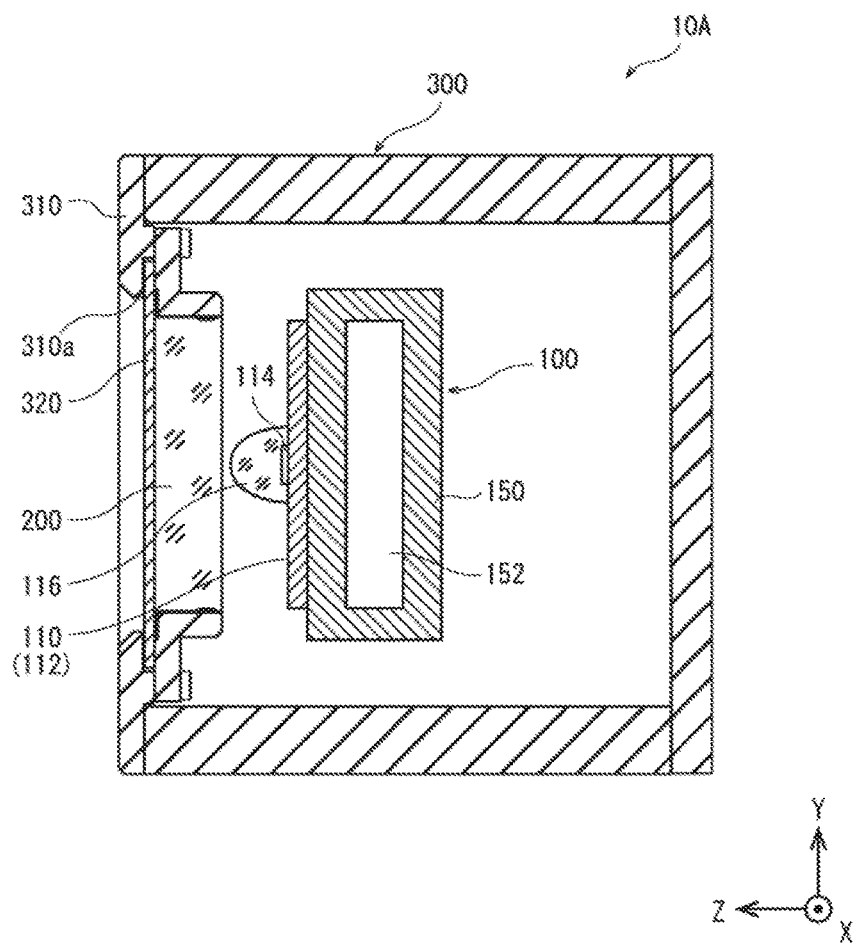
FIG. 2 is a cross-sectional view of an Y-Z plane of a light irradiating device according to a first exemplary embodiment of the present invention.

FIG. 2 is a cross-sectional view of an Y-Z plane of a light irradiating device 10A according to a first exemplary embodiment of the present invention. As illustrated in FIG. 2, the light irradiating device 10A is configured by a light irradiating unit 100 which emits a linear ultraviolet ray, a prism (a distribution control unit) 200, and a case 300 which accommodates the light irradiating unit 100 and the prism 200.

As illustrated in FIG. 2, the case 300 is configured by an aluminum case main body 310 having an opening 310a on a front surface and a glass window unit 320 which is fitted into the opening 310a.

As illustrated in FIG. 2, the light irradiating unit 100 of the exemplary embodiment includes a plurality of LED units 110 and a water cooling heat sink unit 150.

The water cooling heat sink unit 150 is a so-called water cooling heat sink which is disposed to be closely attached to a rear surface of a substrate 112 of the LED unit 110 and radiates heat generated in each LED unit 110. The water cooling heat sink unit 150 is a thin plate shaped member which is formed of a material having good heat conductivity such as aluminum or copper and extends in the X axis direction. In the water cooling heat sink unit 150, a refrigerant pipe (passage) 152 through which refrigerant flows is formed so that the refrigerant (not illustrated) flows from one end of the refrigerant pipe 152 in the X-axis direction to the other end. Further, as refrigerant, water or antifreezing liquid (for example, ethylene glycol, propylene glycol, or mixture thereof with water) may be used. Further, water or antifreezing liquid to which a corrosion inhibitor such as sodium molybdate hydrate or carbon water is added may be used.

Figure 3:
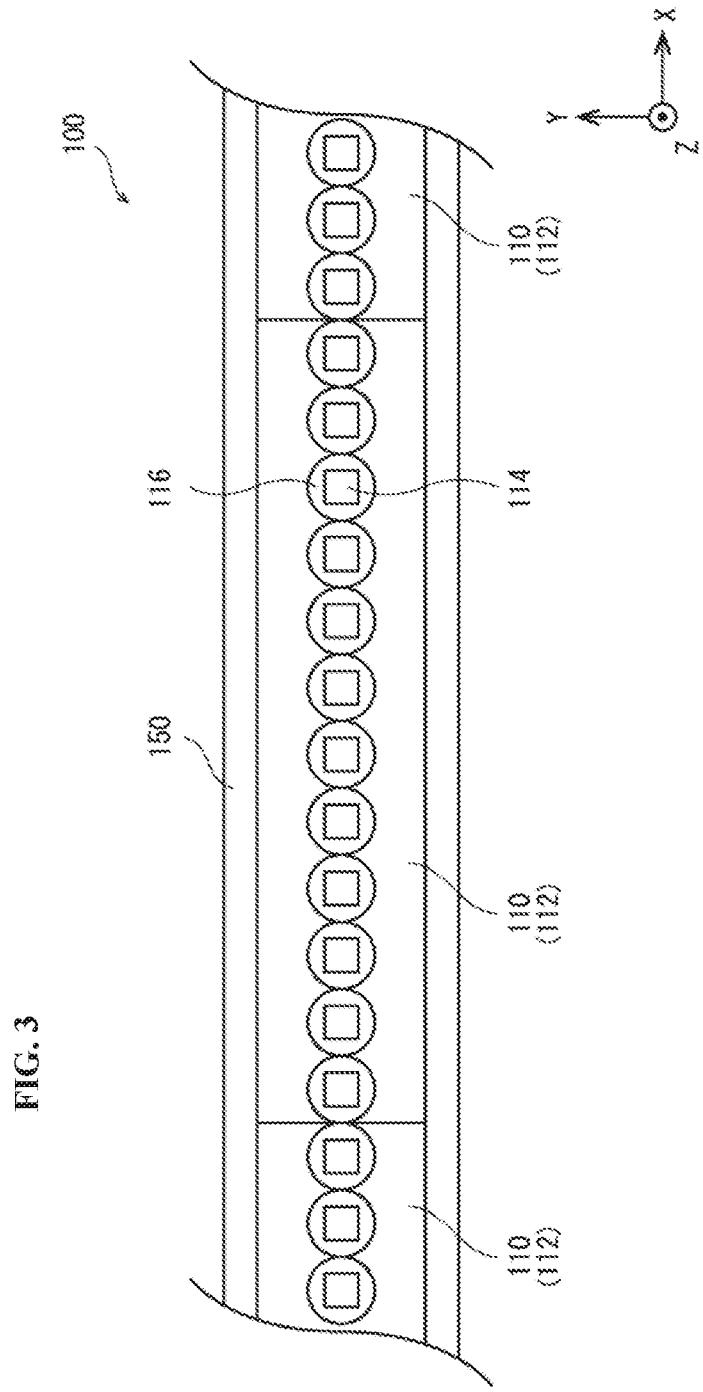
FIG. 3 is a plan view of a light irradiating unit provided in a light irradiating device according to a first exemplary embodiment of the present invention.
Figure 4:
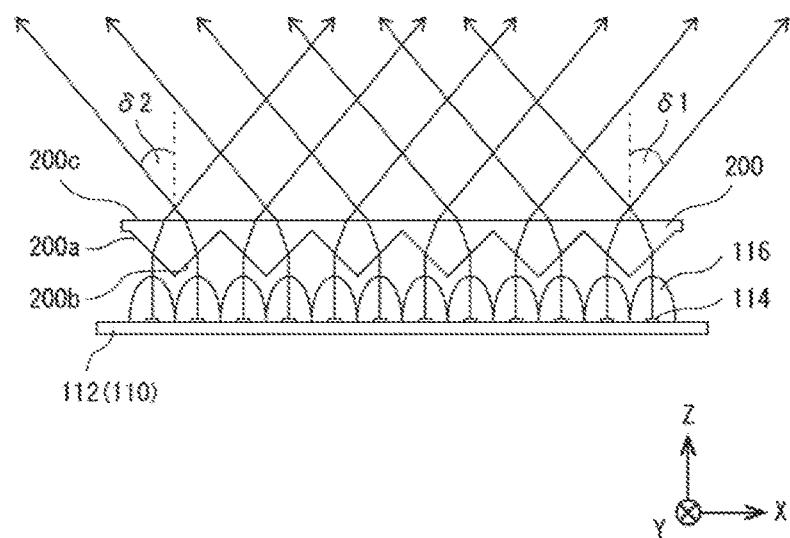
FIG. 4 is a side view for explaining a shape of ultraviolet ray emitted from a light irradiating unit provided in the light irradiating device according to a first exemplary embodiment of the present invention.

FIG. 3 is a plan view (a view seen from a Z-axis direction) of the light irradiating unit 100. Further, FIG. 4 is a side view (a view seen from the Y-axis direction) explaining a shape of ultraviolet ray emitted from the LED unit 110. Further, for the convenience of description, in FIG. 4, only the LED unit 110 and the prism 200 are illustrated and other components are omitted. Further, in FIG. 4, each arrow indicates a center of an optical path of the ultraviolet ray emitted from each LED element 114.

As illustrated in FIG. 3, the LED unit 110 of the exemplary embodiment includes a rectangular shaped substrate 112 which is parallel to the X-axis direction and the Y-axis direction, a plurality of LED elements 114 disposed on the substrate 112, and a plurality of sealing lenses 116 (a light collecting unit) disposed on the optical path to seal each LED element 114. The plurality of LED units 110 is disposed on the surface of the water cooling heat sink unit 150 to be parallel in the X-axis direction.

The substrate 112 of the LED unit 110 is a rectangular shaped wiring substrate formed of a material having high heat conductivity (for example, aluminum nitride). As illustrated in FIG. 3, 12 LED elements 114 are mounted in a chip on board (COB) manner at an approximately center of the surface of the substrate in the Y-axis direction with a predetermined interval along the X-axis direction. An anode pattern (not illustrated) and a cathode pattern (not illustrated) which supply power to each of the LED elements 114 are formed on the substrate 112. Each LED element 114 is electrically connected to the anode pattern and the cathode pattern 209. Further, the substrate 112 is electrically connected to a driver circuit (not illustrated) by a wiring cable which is not illustrated. Further, a driving current is supplied to each LED element 114 from the driver circuit, by means of the anode pattern and the cathode pattern. When the driving current is supplied to each LED element 114, an ultraviolet ray (for example, 365 nm of a wavelength) with a light quantity in accordance with the driving current is emitted from each LED element 114 and a linear ultraviolet ray which is parallel to the X-axis direction is emitted from the LED unit 110. Further, in the exemplary embodiment, a plurality (for example, ten) of LED units 110 is disposed to be parallel to each other in the X-axis direction and the linear ultraviolet ray emitted from each LED unit 110 is continuous in the X-axis direction. Further, a driving current which is supplied to each LED element 114 is adjusted to allow each LED element 114 of the exemplary embodiment to emit the ultraviolet ray having substantially the same light quantity. Further, the linear ultraviolet ray emitted from the plurality of LED units 110 has substantially uniform light quantity distribution in the X-axis direction.

When the power is supplied to the LED unit 110 and the ultraviolet ray is emitted from each LED element 114, the LED element 114 generates heat by itself so that temperature increases and emission efficiency is significantly lowered. However, in the exemplary embodiment, each LED unit 110 is equally cooled by the water cooling heat sink unit 150 so that the above-mentioned problem may be suppressed.

Figure 5:
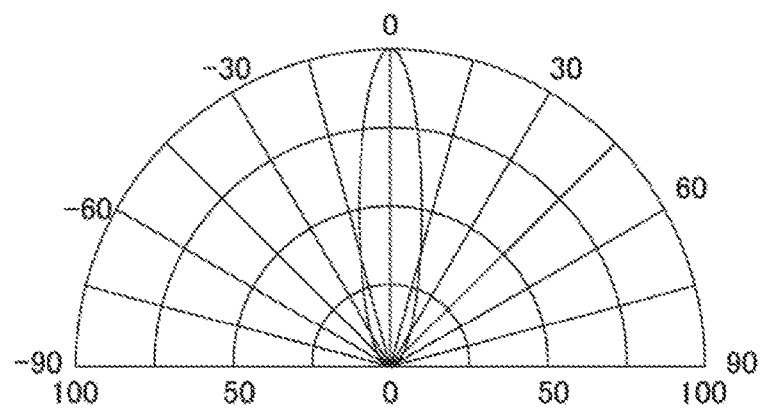
FIG. 5 is a view illustrating a light distribution characteristic of ultraviolet ray emitted from a sealing lens provided in the light irradiating device according to a first exemplary embodiment of the present invention.

The sealing lens 116 is a shell type lens formed of resin (for example, silicon) which has a common optical axis with the LED element 114 and is a member which seals the LED element 114 and serves as a lens which forms the ultraviolet ray emitted from the LED element 114 as an ultraviolet ray having a predetermined spread angle. FIG. 5 is a view illustrating a light distribution characteristic of the ultraviolet ray emitted from the sealing lens 116 of the exemplary embodiment. As illustrated in FIG. 5, when the ultraviolet ray emitted from the LED element 114 passes through the sealing lens 116, the ultraviolet ray is formed as an ultraviolet ray having a narrow spread angle) (±15°) in the Z-axis direction (that is, having a strong directivity). Further, as illustrated in FIG. 4, in the exemplary embodiment, on the optical path of the ultraviolet ray emitted from each sealing lens 116, incident surfaces 200a and 220b of the prism 200 are disposed. The ultraviolet ray emitted from each sealing lens 116 passes through the prism 200 to be emitted.

The prism 200 is an optical element which is formed of glass or resin (for example, silicon) and disposed between the window unit 320 and the light irradiating unit 100 (see FIG. 2) and refracts the ultraviolet ray emitted from each sealing lens 116 at a predetermined angle in the X-axis direction. As illustrated in FIG. 4, the prism 200 according to the exemplary embodiment has a thin plate shape which extends in the X-axis and a side of the prism 200 which faces the light irradiating unit 100 (an upstream side in the Z-axis direction) is formed to have a saw teeth shape and has a plurality of incident surfaces 200a and 200b. Further, on a side of the prism 200 which faces the window unit 320 (that is, downstream side of the Z-axis direction), a planar emission surface 200c is formed.

As illustrated in FIG. 4, the incident surface 200a is inclined at a predetermined inclination angle (for example, −30°) in a counter-clock wise direction (that is, to the upstream side of the X-axis direction) with respect to the Z-axis direction. The incident surface 200b is inclined at a predetermined inclination angle (for example, +30°) in a clock wise direction (that is, to the downstream side of the X-axis direction) with respect to the Z-axis direction. The incident surfaces 200a and 200b are alternately (sequentially) formed in the X-axis direction, corresponding to each LED element 114. As illustrated in FIG. 4, when the ultraviolet ray emitted from the sealing lens 116 is incident onto the incident surface 200a, the ultraviolet ray is refracted by the prism 200 and is emitted at a predetermined first emission angle δ1 (for example, +40° in the downstream side of the X-axis direction) with respect to the Z-axis direction. Further, when the ultraviolet ray emitted from the sealing lens 116 is incident onto the incident surface 200b, the ultraviolet ray is refracted by the prism 200 and is emitted at a predetermined second emission angle δ2 (for example, −40° in the upstream side of the X-axis direction) with respect to the Z-axis direction. As described above, in the exemplary embodiment, the ultraviolet ray emitted from each sealing lens 116 passes through the prism 200 to be emitted in two directions according to the first emission angle δ1 and the second emission angle δ2. Therefore, the light distribution characteristic of the ultraviolet ray emitted from the entire LED unit 110 (that is, the light irradiating device 10A), as illustrated in FIG. 6, is that there are two light distribution peaks (that is, a first light distribution peak D1 and a second light distribution peak D2) according to the first emission angle δ1 and the second emission angle δ2.

Figure 7:
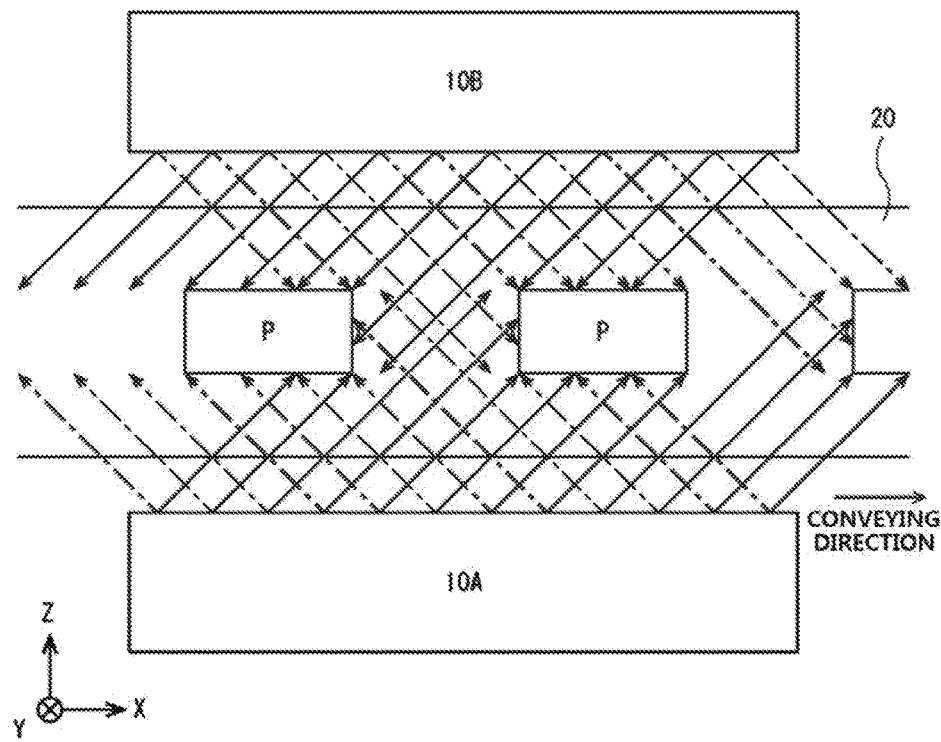
FIG. 7 is a view illustrating a shape of an irradiating object onto which light is irradiated by a light irradiating device according to a first exemplary embodiment of the present invention.

FIG. 7 is a view which describes an effect of the present invention and illustrates a shape of the irradiating object P onto which light is irradiated by the light irradiating devices 10A and 10B of the exemplary embodiment. As described above, the light irradiating devices 10A and 10B of the exemplary embodiment are disposed to face each other with the conveyer belt 20 therebetween and irradiate linear ultraviolet rays onto sides (two surfaces perpendicular to the Z-axis direction) of the irradiating object P from two directions. Here, as described above, the ultraviolet rays emitted from each LED element 114 of the light irradiating devices 10A and 10B are emitted in two directions (two directions indicated by a solid line arrow and a one dot chain line arrow in FIG. 7) according to the first emission angle δ1 and the second emission angle δ2. Therefore, the ultraviolet rays emitted from the LED element 114 pass between the irradiating object P to be irradiated not only onto sides (two surfaces perpendicular to the Z-axis direction) of the irradiating object P, but also onto the front surface (a surface at the downstream side of the X-axis direction) and a rear surface (a surface at the upstream side of the X-axis direction) of the irradiating object P. That is, according to the configuration of the exemplary embodiment, the ultraviolet rays are irradiated not only onto a surface (that is, the side of the irradiating object P) perpendicular to the arrangement direction of the light irradiating devices 10A and 10B but also onto a surface (that is, the front surface and the rear surface of the irradiating object P) which is parallel to the arrangement direction of the light irradiating devices 10A and 10B at once. Therefore, there is no need to separately provide a light irradiating device for hardening the ultraviolet curable resin applied on a surface (that is, the front surface and the rear surface of the irradiating object P) which is parallel to the arrangement direction of the light irradiating devices 10A and 10B.

Even though the exemplary embodiment has been described above, the present invention is not limited to the above-described configuration and may be modified in various forms within a scope of a technical spirit of the present invention.

Figure 6:
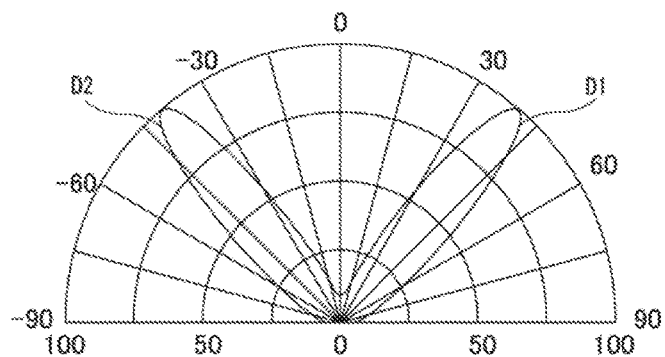
FIG. 6 is a view illustrating a light distribution characteristic of ultraviolet ray emitted from the light irradiating device according to a first exemplary embodiment of the present invention.
Figure 8:
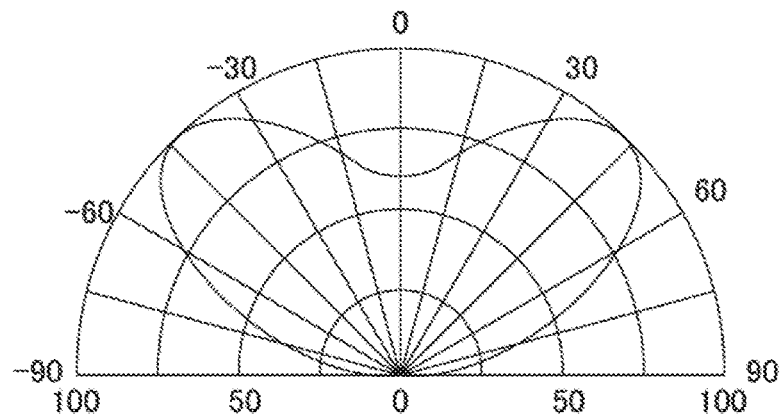
FIG. 8 is a view illustrating a modified embodiment of a light distribution characteristic of ultraviolet ray emitted from the light irradiating device according to a first exemplary embodiment of the present invention.

For example, in the exemplary embodiment, it is described that the ultraviolet rays emitted from the light irradiating devices 10A and 10B have a light distribution characteristic (that is, the ultraviolet ray having a spread angle (±15°) is emitted at an emission angle of ±40°) illustrated in FIG. 6. However, the light distribution characteristic may appropriately vary by changing a shape of the sealing lens 116. For example, as illustrated in FIG. 8, the ultraviolet rays emitted to two directions may be set to have a spread angle of approximately ±30° and be emitted at an emission angle of ±45°.

Figure 9:
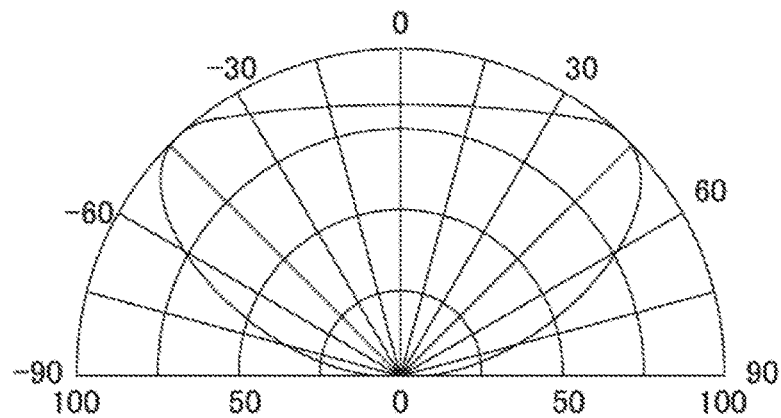
FIG. 9 is a view illustrating a modified embodiment of a light distribution characteristic of ultraviolet ray emitted from the light irradiating device according to a first exemplary embodiment of the present invention.

In the exemplary embodiment, it is described that the ultraviolet rays emitted from the light irradiating devices 10A and 10B have two light distribution peaks (that is, the first light distribution peak D1 and the second light distribution peak D2) according to the first emission angle δ1 and the second emission angle δ2. However, the light distribution characteristic may have a predetermined intensity in the Z-axis direction (a direction of 0° degree) as illustrated in FIG. 9 by changing an inclination angle of the incident surfaces 200a and 200b of the prism 200 or adding an incident surface having an inclination angle which is different from those of the incident surfaces 200a and 200b.

In the exemplary embodiment, it is described that the first emission angle δ1 and the second emission angle δ2 (that is, the first light distribution peak D1 and the second light distribution peak D2) are +40° and −40°, respectively, but a shadow of the adjacent irradiating object P may be formed according to the arrangement interval of the irradiating objects P which are conveyed by the conveyer belt 20 so that the ultraviolet ray may not be incident onto the front surface and the rear surface of the irradiating object P in some cases. Therefore, the inclination angles of the incident surfaces 200a and 200b of the prism 200 are adjusted and the first emission angle δ1 and the second emission angle δ2 (that is, the first light distribution peak D1 and the second light distribution peak D2) may be changed according to the arrangement interval of the irradiating objects P. Further, the light distribution characteristic may have at least two light distribution peaks which are inclined at the downstream side and the upstream side of the X-axis direction or may have three or more light distribution peaks.

In the exemplary embodiment, as an optical element which refracts the ultraviolet ray emitted from each sealing lens 116 in the X-axis direction at a predetermined angle, the prism 200 is used. However, instead of the prism 200, a diffraction pattern may be applied.

(Second Exemplary Embodiment)

Figure 10:
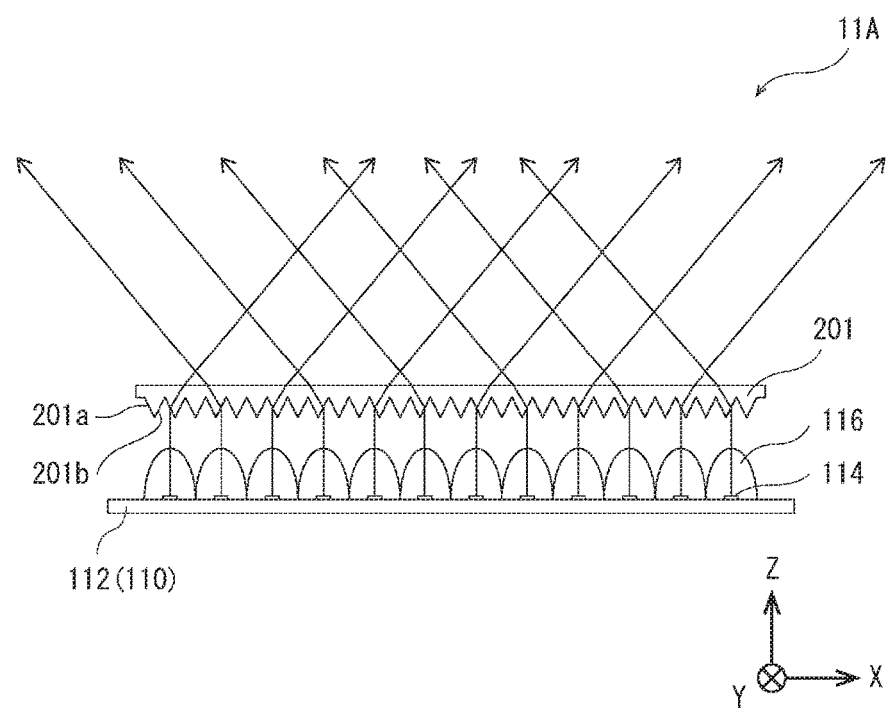
FIG. 10 is a view illustrating a configuration of a light irradiating device according to a second exemplary embodiment of the present invention.

FIG. 10 is a view illustrating a configuration of a light irradiating device 11A according to a second exemplary embodiment of the present invention. Further, for the convenience of description, in FIG. 10, only an LED unit 110 and a prism 201 are illustrated and other components are omitted.

As illustrated in FIG. 10, a light irradiating device 11A of the exemplary embodiment is different from the light irradiating device 10A of the first exemplary embodiment in that the incident surfaces 201a and 201b of the prism 201 are formed at a pitch which is smaller than the interval of the LED elements 114. As described above, even though the incident surfaces 201a and 201b are formed at a pitch which is smaller than the interval of the LED elements 114, if the incident surfaces 201a and 201b are inclined at a predetermined inclination angle (for example, ±30°) with respect to the Z-axis direction, the ultraviolet ray emitted from each sealing lens 116 passes through the prism 201, to be emitted in two directions according to the first emission angle δ1 and the second emission angle δ2. Therefore, the light distribution characteristic of the ultraviolet ray emitted from the light irradiating device 11A of the exemplary embodiment also has two light distribution peaks, which is the same as the light distribution characteristic of the first exemplary embodiment.

(Third Exemplary Embodiment)

Figure 11:
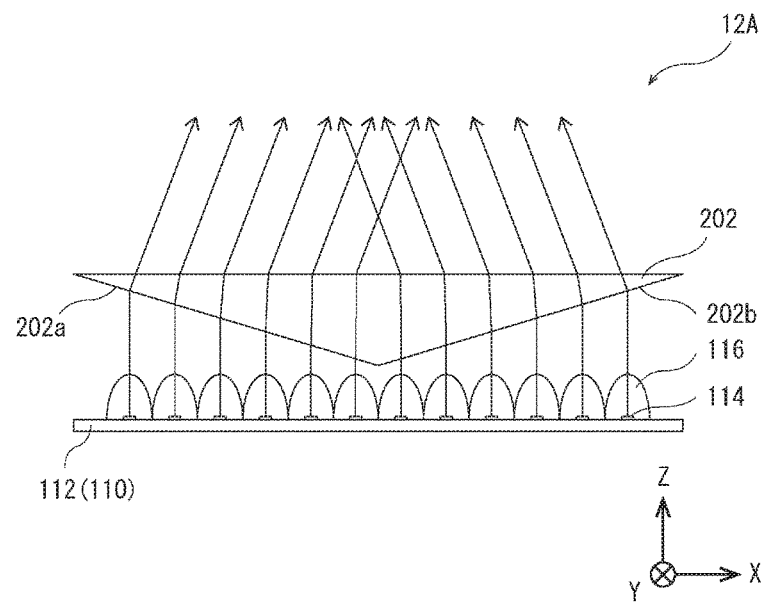
FIG. 11 is a view illustrating a configuration of a light irradiating device according to a third exemplary embodiment of the present invention.

FIG. 11 is a view illustrating a configuration of a light irradiating device 12A according to a third exemplary embodiment of the present invention. Further, for the convenience of description, in FIG. 11, only the LED unit 110 and the prism 202 are illustrated and other components are omitted.

As illustrated in FIG. 11, a light irradiating device 12A of the exemplary embodiment is different from the light irradiating device 10A of the first exemplary embodiment in that the incident surfaces 202a and 202b of the prism 202 are formed at a pitch which is larger than the interval of the LED elements 114 and ultraviolet rays are incident onto each of the incident surfaces 202a and 202b from six LED elements 114. As described above, even though the incident surfaces 202a and 202b are formed at a pitch which is larger than the interval of the LED elements 114, if the incident surfaces 202a and 202b are inclined at a predetermined inclination angle (for example, ±30°) with respect to the Z-axis direction, the ultraviolet ray emitted from each sealing lens 116 passes through the prism 202, to be emitted in two directions according to the first emission angle δ1 and the second emission angle δ2. Therefore, the light distribution characteristic of the ultraviolet ray emitted from the light irradiating device 12A of the exemplary embodiment also has two light distribution peaks, which is the same as the light distribution characteristic of the first exemplary embodiment (Fourth Exemplary Embodiment)

Figure 12:
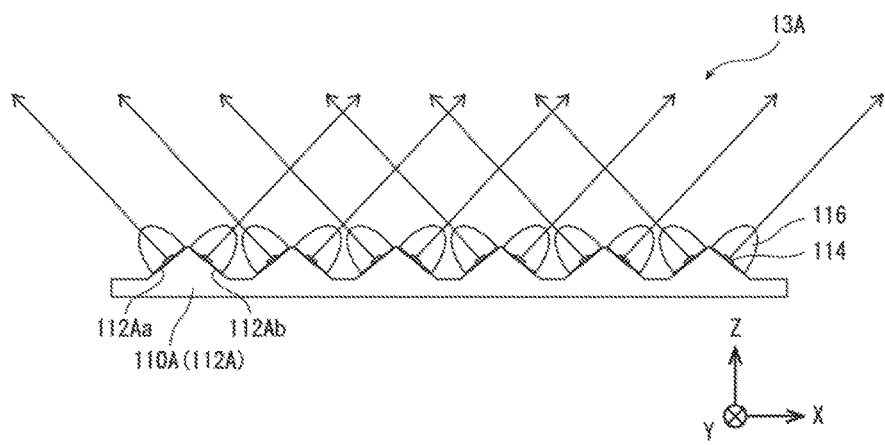
FIG. 12 is a view illustrating a configuration of a light irradiating device according to a fourth exemplary embodiment of the present invention.

FIG. 12 is a view illustrating a configuration of a light irradiating device 13A according to a fourth exemplary embodiment of the present invention. Further, for the convenience of description, in FIG. 12, only an LED unit 110A is illustrated and other components are omitted.

As illustrated in FIG. 12, a light irradiating device 13A of the exemplary embodiment does not include a prism 200, a surface of a substrate 112A of an LED unit 110A is formed to have a saw teeth shape and a plurality of inclination surfaces 112Aa and 112Ab is formed, which is different from the light irradiating device 10A of the first exemplary embodiment. A plurality of incident surfaces 112Aa of the exemplary embodiment is inclined at a predetermined inclination angle (for example, +40°) in a clock wise direction with respect to the Z-axis direction and the incident surface 112Ab is inclined at a predetermined inclination angle (for example, −40°) in a counter-clock wise direction with respect to the Z-axis direction, and the inclination surfaces 112Aa and 112Ab are alternately (sequentially) formed in the X-axis direction. Further, an LED element 114 and a sealing lens 116 are mounted on each inclination surface 112Aa and 112Ab. That is, in this exemplary embodiment, an optical axis of the LED element 114 and the sealing lens 116 which are mounted on the inclination surface 112Aa is inclined to match the second emission angle δ2 and an optical axis of the LED element 114 and the sealing lens 116 which are mounted on the inclination surface 112Ab is inclined to match the first emission angle δ1. Therefore, also with this configuration, the ultraviolet ray emitted from the sealing lens 116 is emitted in two directions (that is, two directions according to the first emission angle δ1 and the second emission angle δ2) according to the inclination surfaces 112Aa and 112Ab. Therefore, the light distribution characteristic of the ultraviolet ray emitted from the light irradiating device 13A of the exemplary embodiment also has two light distribution peaks, which is the same as the light distribution characteristic of the first exemplary embodiment (Fifth Exemplary Embodiment)

Figure 13:
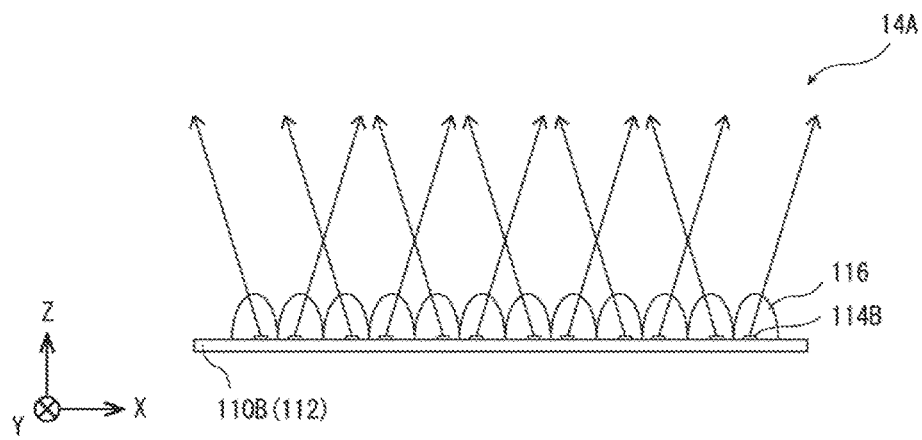
FIG. 13 is a view illustrating a configuration of a light irradiating device according to a fifth exemplary embodiment of the present invention.

FIG. 13 is a view illustrating a configuration of a light irradiating device 14A according to a fifth exemplary embodiment of the present invention. Further, for the convenience of description, in FIG. 13, only the LED unit 110B is illustrated and other components are omitted.

As illustrated in FIG. 13, a light irradiating device 14A of the exemplary embodiment does not include a prism 200 and a plurality of LED elements 114B of an LED unit 110B is slightly shifted in the upstream side and downstream side (that is, in two directions) of the X-axis direction with respect to the optical axis of the sealing lens 116, which is different from the light irradiating device 10A of the first exemplary embodiment. As described above, when the plurality of LED elements 114B is disposed to be slightly shifted to the upstream side and downstream side (that is, two directions) of the X-axis direction with respect to the optical axis of the sealing lens 116, the ultraviolet ray emitted from each LED element 114B is slightly refracted to the upstream side and the downstream side (that is, two directions) of the X-axis direction. That is, also with the configuration of this exemplary embodiment, the ultraviolet rays emitted from each sealing lens 116 are emitted in two directions (two directions according to the first emission angle δ1 and the second emission angle δ2) according to a shifted amount of the LED element 114B with respect to the optical axis of the sealing lens 116. Therefore, the light distribution characteristic of the ultraviolet ray emitted from the light irradiating device 14A of the exemplary embodiment also has two light distribution peaks, which is the same as the light distribution characteristic of the first exemplary embodiment (Sixth Exemplary Embodiment)

Figure 14:
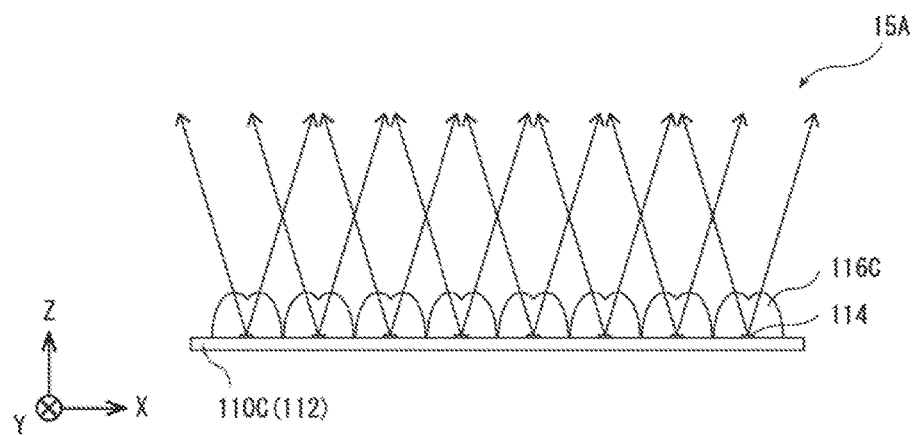
FIG. 14 is a view illustrating a configuration of a light irradiating device according to a sixth exemplary embodiment of the present invention.

FIG. 14 is a view illustrating a configuration of a light irradiating device 15A according to a sixth exemplary embodiment of the present invention. Further, for the convenience of description, in FIG. 14, only the LED unit 110C is illustrated and other components are omitted.

As illustrated in FIG. 14, a light irradiating device 15A of the exemplary embodiment does not include a prism 200 and each sealing lens 116C of the LED unit 110C has a shape obtained by coupling two shell shaped lenses in the X-axis direction and includes two optical axes, which is different from the light irradiating device 10A of the first exemplary embodiment. As described above, when each sealing lens 116C includes two optical axes, an ultraviolet ray emitted from each LED element 114 disposed at a central portion of the sealing lens 116C is emitted by being divided into the upstream side and downstream side (that is, two directions) of the X-axis direction. That is, also with the configuration of this exemplary embodiment, the ultraviolet rays are emitted from each sealing lens 116C into two directions (two directions according to the first emission angle δ1 and the second emission angle δ2) according to a shifted amount of the LED element 114 with respect to the two optical axes of the sealing lens 116C. Therefore, the light distribution characteristic of the ultraviolet ray emitted from the light irradiating device 15A of the exemplary embodiment also has two light distribution peaks, which is the same as the light distribution characteristic of the first exemplary embodiment (Seventh Exemplary Embodiment)

Figure 15:
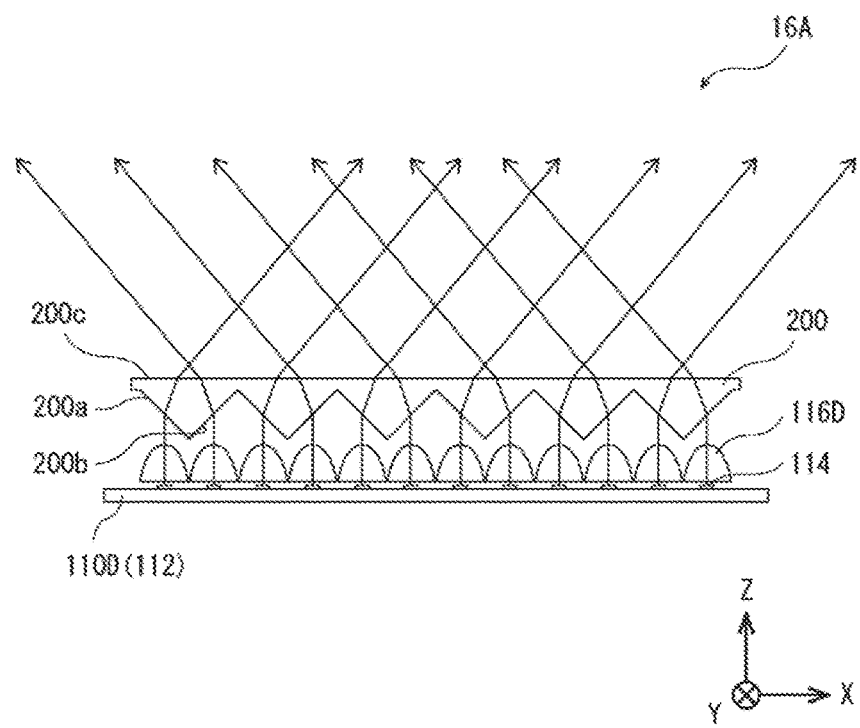
FIG. 15 is a view illustrating a configuration of a light irradiating device according to a seventh exemplary embodiment of the present invention.

FIG. 15 is a view illustrating a configuration of a light irradiating device 16A according to a seventh exemplary embodiment of the present invention. As illustrated in FIG. 15, a light irradiating device 16A of the exemplary embodiment is different from the light irradiating device 10A of the first exemplary embodiment in that an LED unit 110D includes a light collecting lens (for example, a plano-convex lens) 116D supported by a supporting member (not illustrated) instead of the sealing lens 116. Further, for the convenience of description, in FIG. 15, only the LED unit 110D and the prism 200 are illustrated and other components are omitted.

As described above, a light distribution characteristic which is substantially the same as the sealing lens 116 of the first exemplary embodiment may be achieved by a general light collecting lens 116D (that is, the ultraviolet ray emitted from the LED element 114 may be formed to have narrow spread angle) and the ultraviolet ray emitted from the light collecting lens 116D passes through the prism 200 so that the ultraviolet ray has two light distribution peaks, which is the same as the light distribution characteristic of the first exemplary embodiment.

(Eighth Exemplary Embodiment)

Figure 16A:
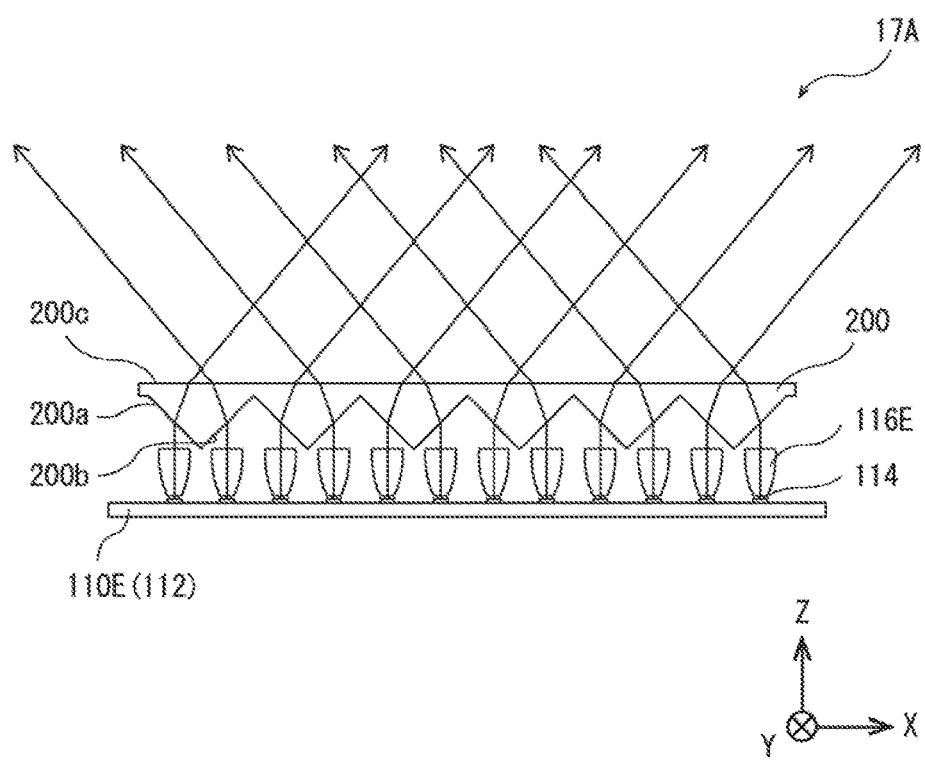
FIG. 16A and FIG. 16B are views illustrating a configuration of a light irradiating device according to an eighth exemplary embodiment of the present invention.
Figure 16B:
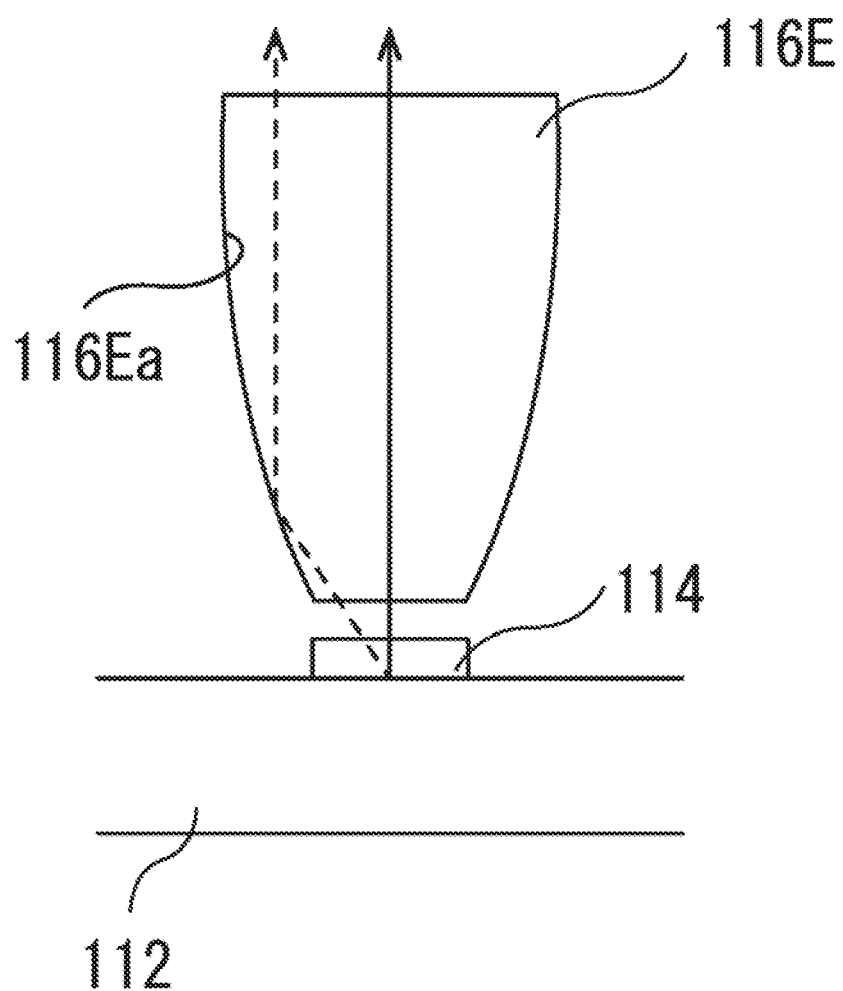

FIG. 16 is a view illustrating a configuration of a light irradiating device 17A according to an eighth exemplary embodiment of the present invention. As illustrated in FIG. 16, a light irradiating device 17A of the exemplary embodiment is different from the light irradiating device 10A of the first exemplary embodiment in that an LED unit 110E includes a light collecting mirror 116E supported by a supporting member (not illustrated), instead of the sealing lens 116. Further, FIG. 16A is a schematic view illustrating a configuration of the LED unit 110E and the prism 200 of the exemplary embodiment and FIG. 16B is an enlarged view illustrating a shape of an ultraviolet ray emitted from the light collecting mirror 116E mounted on the LED unit 110E of the exemplary embodiment.

As illustrated in FIG. 16B, the light collecting mirror 116E is a substantially cylindrical hollow member and is disposed so as to have a common optical axis with the LED element 114 and includes a reflective surface 116Ea which reflects light (a broken line arrow in FIG. 16B) having a large spread angle emitted from the LED element 114 to be a light flux which is substantially parallel to the Z-axis direction. As described above, when the light collecting mirror 116E is used, the ultraviolet ray emitted from the light collecting mirror 116E is shaped to have a very narrow spread angle (having a strong directivity) but passes through the prism 200 to have two light distribution peaks, which is the same as the light distribution characteristic of the first exemplary embodiment. Further, as the reflective surface 116Ea, a known parabolic surface or ellipsoidal surface may be applied. Further, the light collecting mirror 116E is not limited to the hollow shape, and for example, may have a solid shape formed of glass or resin.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

EXPLANATION OF REFERENCE NUMERALS AND SYMBOLS

1 Light irradiating system
10A, 10B, 11A, 12A, 13A, 14A, 15A, 16A, 17A Light irradiating device
20 Conveyer belt
100 Light irradiating unit
110, 110A, 110B, 110C, 110D, 110E LED unit
112, 112A Substrate
112Aa, 112Ab Inclination surfaces
114, 114B LED element
116, 116C Sealing lens
116D Light collecting lens
116E Light collecting mirror
116Ea Reflective surface
150 Water cooling heat sink unit
152 Refrigerant pipe
200, 201, 202 Prism
200a, 200b, 201a, 201b, 202a, 202b Incident surfaces
200c Emission surface
300 Case
310 Case main body
310a Opening
320 Glass window unit

What is claimed is:

1. A light irradiating device which irradiates an ultraviolet ray on a three-dimensional irradiating object which relatively moves along a first direction to harden an ultraviolet curable resin applied on a surface of the irradiating object, the device comprising:
a plurality of LED elements which is disposed on a substrate along the first direction and irradiates the ultraviolet ray on the irradiating object; and a plurality of light collecting units which is disposed in an optical path of each LED element and forms the ultraviolet ray emitted from each LED element to have a narrow spread angle, wherein the plurality of LED elements includes first LED elements having a first light distribution peak which is inclined to an upstream side of the first direction at a first angle and second LED elements having a second light distribution peak which is inclined to a downstream side of the first direction at a second angle, with respect to a second direction which is perpendicular to the first direction, and wherein the first LED elements and the second LED elements are alternately disposed along the first direction.

2. The light irradiating device of claim 1, wherein the plurality of LED elements and the plurality of light collecting units have a common optical axis which is parallel to the second direction and the light irradiating device further includes a light distribution control unit which includes a first incident surface inclined toward the upstream side of the first direction with respect to the optical axis and a second incident surface inclined toward the downstream side of the first direction and emits the ultraviolet ray emitted from the plurality of light collecting units by being refracted at the first angle and the second angle.

3. The light irradiating device of claim 2, wherein the first incident surface and the second incident surface are alternately formed along the first direction.

4. The light irradiating device of claim 3, wherein the plurality of LED elements is disposed with a predetermined interval along the first direction and the first incident surface and the second incident surface are alternately formed with the predetermined interval so as to correspond to each LED element.

5. The light irradiating device of claim 3, wherein the plurality of LED elements is disposed with a predetermined interval along the first direction and the first incident surface and the second incident surface are formed with an interval which is smaller than the predetermined interval.

6. The light irradiating device of claim 3, wherein the plurality of LED elements is disposed with a predetermined interval along the first direction and the first incident surface and the second incident surface are formed with an interval which is larger than the predetermined interval.

7. The light irradiating device of claim 2, wherein the light distribution control unit is a prism.

8. The light irradiating device of claim 1, wherein each of the LED elements and each of the light collecting units configure an LED module and the LED module is configured by a first LED module having an optical axis inclined at the first angle with respect to the second direction and a second LED module having an optical axis inclined at the second angle with respect to the second direction.

9. The light irradiating device of claim 8, wherein each of the LED elements and each of the light collecting units have a common optical axis and an attached surface of the first LED module and the second LED module is inclined with respect to the second direction.

10. The light irradiating device of claim 8, wherein each of the LED elements and each of the light collecting units have different optical axes and an attached surface of the first LED module and the second LED module is a plane perpendicular to the second direction.

11. The light irradiating device of claim 1, wherein the light collecting unit is a light collecting lens or a light collecting mirror.

12. A light irradiating device which irradiates an ultraviolet ray on a three-dimensional irradiating object which relatively moves along a first direction to harden an ultraviolet curable resin applied on a surface of the irradiating object, the device comprising:

a plurality of LED elements which is disposed on a substrate along the first direction and irradiates the ultraviolet ray on the irradiating object; and a plurality of light collecting units which is disposed in an optical path of each LED element and forms the ultraviolet ray emitted from each LED element to have a narrow spread angle, wherein the ultraviolet ray emitted from each of the LED elements is divided by the light collecting unit so that the ultraviolet ray has both a first light distribution peak which is inclined to an upstream side of the first direction at a first angle and a second light distribution peak which is inclined to a downstream side of the first direction at a second angle, with respect to a second direction which is perpendicular to the first direction.

* * * * *